(12) United States Patent
Bradler et al.

(10) Patent No.: US 11,543,668 B2
(45) Date of Patent: Jan. 3, 2023

(54) METHODS AND APPARATUS FOR MITIGATING IMPERFECTIONS IN OPTICAL CIRCUITS

(71) Applicant: Xanadu Quantum Technologies Inc., Toronto (CA)

(72) Inventors: Kamil Bradler, Toronto (CA); Ish Dhand, Toronto (CA)

(73) Assignee: Xanadu Quantum Technologies Inc., Toronto (CA)

(*) Notice: Subject to any disclaimer, the term of this patent is extended or adjusted under 35 U.S.C. 154(b) by 0 days.

(21) Appl. No.: 17/032,557

(22) Filed: Sep. 25, 2020

(65) Prior Publication Data
US 2021/0096384 A1 Apr. 1, 2021

Related U.S. Application Data

(60) Provisional application No. 62/906,455, filed on Sep. 26, 2019.

(51) Int. Cl.
*H04J 14/00* (2006.01)
*G02B 27/14* (2006.01)
*H04Q 11/00* (2006.01)
*H04B 10/27* (2013.01)

(52) U.S. Cl.
CPC .............. *G02B 27/14* (2013.01); *H04B 10/27* (2013.01); *H04Q 11/0005* (2013.01)

(58) Field of Classification Search
CPC .... G02B 27/14; H04B 10/27; H04Q 11/0005; G06N 3/04; G06N 10/00; G06N 20/00; G01B 9/02049; G01B 9/02083; B82Y 20/00
See application file for complete search history.

(56) References Cited

U.S. PATENT DOCUMENTS

| | | | |
|---|---|---|---|
| 2014/0299743 A1* | 10/2014 | Miller | G02F 1/0136 359/629 |
| 2015/0354938 A1* | 12/2015 | Mower | B82Y 20/00 356/450 |
| 2019/0086610 A1* | 3/2019 | Clements | H04B 10/2581 |

OTHER PUBLICATIONS

Wilkes, "60.5 dB Silicon Mach-Zehnder Interferometer using Self-Optimising Beam-Splitters", Oct. 2016, Frontiers in Optics/Laser Science, All pages. (Year: 2016).*

* cited by examiner

*Primary Examiner* — Pranesh K Barua
(74) *Attorney, Agent, or Firm* — Cooley LLP

(57) ABSTRACT

A method includes configuring a first plurality of beamsplitters in a network of interconnected beamsplitters of an optical circuit into a transmissive state. The optical circuit is configured to perform a linear transformation of N input optical modes, where N is a positive integer. The first plurality of beamsplitters is located along a beam path within the optical circuit and traversing a target location. The method also includes configuring a second plurality of beamsplitters in the network of interconnected beamsplitters of the optical circuit into a reflective state to reconfigure the optical circuit into a reconfigured optical circuit. The reconfigured optical circuit is configured to perform a linear transformation on M input optical modes, where M is a positive integer less than N. The second plurality of beamsplitters is located along at least one edge of the optical circuit.

23 Claims, 9 Drawing Sheets

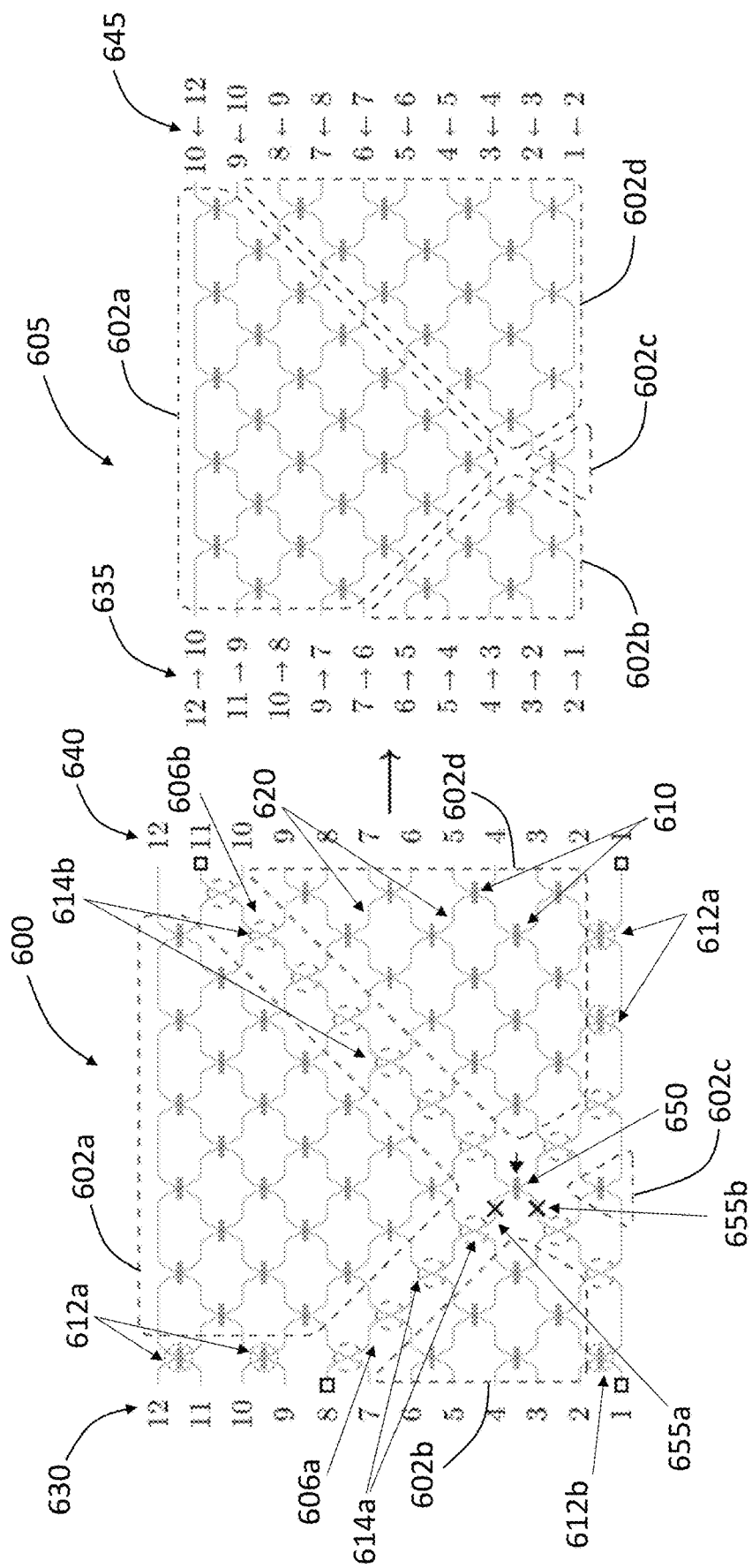

METHODS AND APPARATUS FOR MITIGATING IMPERFECTIONS IN OPTICAL CIRCUITS

CROSS-REFERENCE TO RELATED APPLICATIONS

This application claims the benefit of U.S. Provisional Patent Application No. 62/906,455, filed Sep. 26, 2019 and titled "Methods and Apparatus for Mitigating Imperfections in Optical Circuits," the entire content of which is incorporated by reference herein in its entirety for all purposes.

FIELD

One or more embodiments relate to mitigating imperfections in optical circuits.

BACKGROUND

Scaling up linear optics (e.g., linear optical interferometers) to a large number of optical modes is a promising approach towards obtaining a quantum advantage in simulation, computation, communication, and metrology. For example, interferometers acting on thousands of optical modes can outperform classical computers in processing boson sampling tasks. Scaling up linear optics, however, also increases the number of optical components in the resulting optical circuits and accordingly the probability of having one or more imperfections in the optical circuit.

An optical circuit can have at least two types of imperfections. The first type of imperfection includes lossy modes and unresponsive optical components (e.g., a reconfigurable beamsplitter unresponsive to external control). Known methods to address this type of imperfection usually include fabricating multiple copies of the same optical circuits for quality inspection, discarding the defective ones, and choosing optical circuits that are free of defect. This approach may be feasible for small scale optical circuits. As the number of optical modes increases, however, the number of copies to be fabricated also increases (e.g., by two to four orders of magnitude), thereby incurring significant costs.

The second type of imperfections in an optical circuit includes compromised parameter ranges of an optical component. For example, the extinction ratio of a beamsplitter may be specified as from 0:100 to 100:0, but the actual dynamic range of this beamsplitter may be between 5:95 and 95:5. Known methods of addressing this type of imperfection include nonlinear optimization and self-reconfiguring optics, but nonlinear optimization does not guarantee the existence of any solution and self-reconfiguring optics typically increases the footprint of the resulting optical circuit (e.g., at least by a factor of two).

SUMMARY

Some embodiments described herein relate generally to mitigating imperfections in optical circuits, and, in particular, to mitigating imperfections in optical circuits via reconfiguring the optical circuit to either circumvent the imperfection or use optical components affected by the imperfections in a compatible way. In some embodiments, a method includes configuring a first plurality of beamsplitters in a network of interconnected beamsplitters of an optical circuit into a transmissive state. The optical circuit is configured to perform a linear transformation of N input optical modes, where N is a positive integer. The first plurality of beamsplitters is located along a beam path within the optical circuit and traversing a target location. The method also includes configuring a second plurality of beamsplitters in the network of interconnected beamsplitters of the optical circuit into a reflective state to reconfigure the optical circuit into a reconfigured optical circuit. The reconfigured optical circuit is configured to perform a linear transformation on M input optical modes, where M is a positive integer less than N. The second plurality of beamsplitters is located along at least one edge of the optical circuit.

In some embodiments, an apparatus includes N input ports, where N is a positive integer. The apparatus also includes a network of interconnected beamsplitters in optical communication with the N input ports. The network of interconnected beamsplitters includes a first plurality of beamsplitters located along a beam path traversing a target location and configured into a transmissive state, a second plurality of beamsplitters located along at least one edge of the network of interconnected beamsplitters and configured into a reflective state, and a third plurality of beamsplitters that are reconfigurable and configured to perform a linear transformation on M input optical modes, where M is a positive integer less than N.

In some embodiments, a method includes determining a first setting of an optical circuit including a plurality of optical components to implement a first linear transformation on a plurality of input optical modes. The first linear transformation is characterized by a first matrix. The first setting includes a first target parameter beyond a parameter range of an optical component in the plurality of optical components. The method also includes determining a second setting of the optical circuit to implement a second linear transformation on the plurality of input optical modes. The second linear transformation is characterized by a second matrix generated by permuting two rows or two columns of the first matrix. The second setting includes a second target parameter within the parameter range of the optical component. The method also includes configuring the optical circuit into the second setting to perform the second linear transformation on the plurality of input optical modes.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

FIGS. 6A and 6B show a schematic of an original linear interferometer and a reconfigured linear interferometer, respectively, to illustrate a method of mitigating an imperfection that affects multiple optical modes, according to an embodiment.

DETAILED DESCRIPTION

One or more methods, apparatus, and systems described herein employ an approach to mitigate imperfection in an optical circuit by reconfiguring the optical circuit to either circumvent the imperfection or use optical components affected by the imperfection in a compatible way. To mitigate the first type of imperfections (e.g., lossy modes and unresponsive optical components), an approach described herein that includes selecting the setting of some optical components (e.g., beamsplitters) such that the rest of the optical components form a new optical circuit (also referred to as a reconfigured optical circuit). The new optical circuit can be substantially similar to the original optical circuit except that the new optical circuit is configured to process a smaller number of optical modes. For the second type of imperfections (e.g., compromised parameter ranges in optical components), an approach includes permuting the input and/or output ports of the optical circuit (e.g., by relabeling the input and/or output ports) such that the permuted optical circuit is configured to implement a target transformation with a setting that is within the parameter range of every individual optical component. By reconfiguring the optical circuit having imperfections, the approach can be more cost effective compared to known methods because this approach neither discards the entire optical circuit nor increases the footprint of the optical circuit.

Figure 1A:
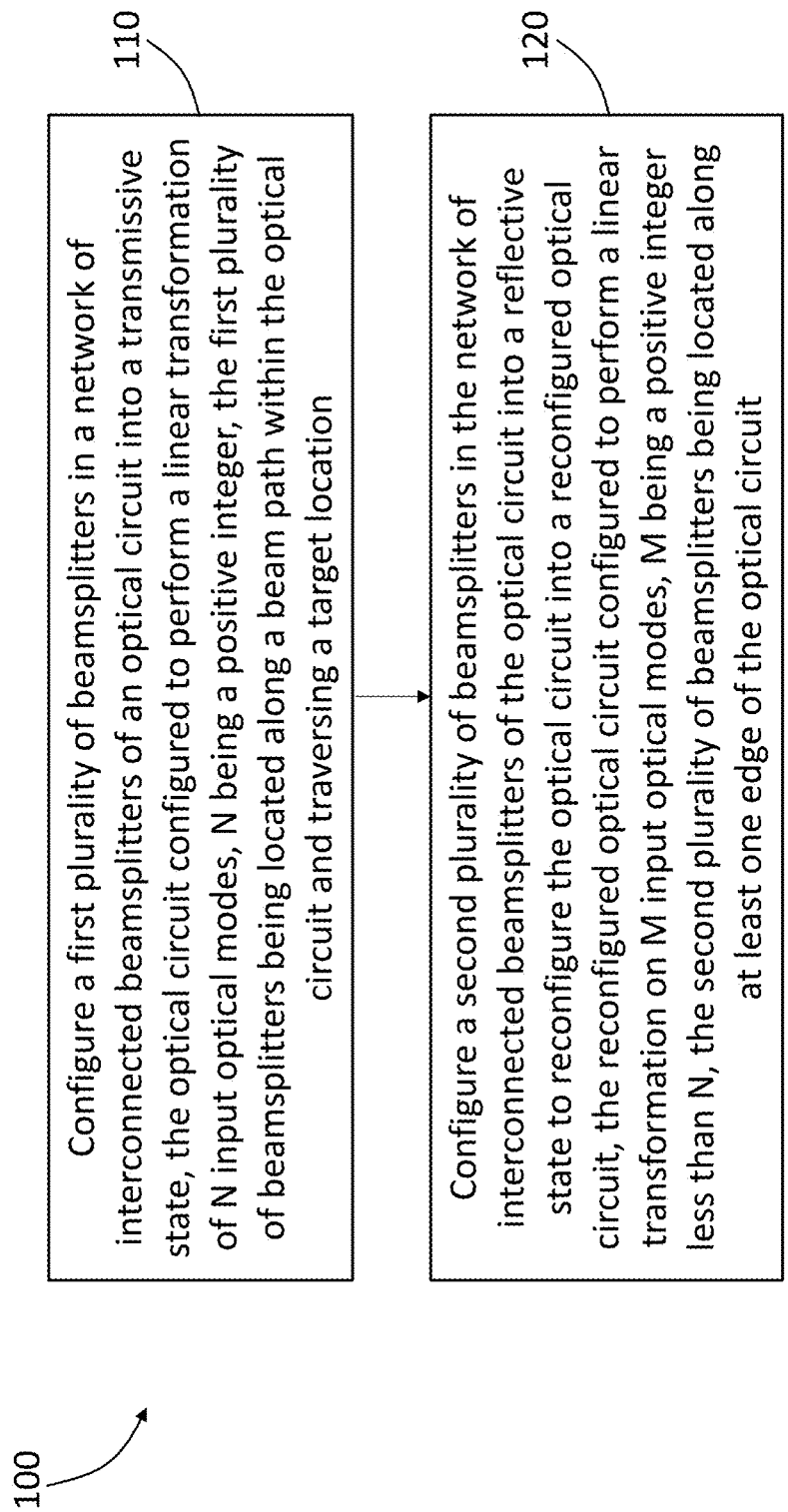
FIG. 1A is a flowchart illustrating a method of mitigating imperfections in optical circuits, according to an embodiment.

FIG. 1A is a flowchart illustrating a method 100 of mitigating an imperfection in an optical circuit by circumventing the imperfection, according to an embodiment. The method 100 includes, at 110, configuring a first plurality of beamsplitters in a network of interconnected beamsplitters of an optical circuit (also referred to as an original optical circuit) into a transmissive state. The optical circuit is configured to perform a linear transformation of N input optical modes, where N is a positive integer. The first plurality of beamsplitters is located along a beam path within the optical circuit and traversing a target location.

The method also includes, at 120, configuring a second plurality of beamsplitters in the network of interconnected beamsplitters of the optical circuit into a reflective state to reconfigure the optical circuit into a reconfigured optical circuit. The reconfigured optical circuit is configured to perform a linear transformation on M input optical modes, where M is a positive integer less than N (i.e., M<N). The second plurality of beamsplitters is located along at least one edge of the optical circuit.

The beamsplitters in the reconfigured optical circuit can be divided into three groups. The first group includes the first plurality of beamsplitters configured into the transmissive state and the second group includes the second plurality of beamsplitters configured into the reflective state. Other beamsplitters in the reconfigured optical circuit remain reconfigurable, i.e., their transmission ratio is still tunable, and they constitute the functional part of the reconfigured optical circuit to perform linear transformations to input optical modes. The first and second plurality of beamsplitters, due to their fixed setting, effectively carve out an isolated region including the target location (e.g., a defect) in the original optical circuit, and the isolated region does not participate in the linear transformation of input optical modes. In this manner, the target location is circumvented and the reconfigured optical circuit is substantially identical to the original optical circuit except that the reconfigured optical circuit is configured to process a smaller number of optical modes (i.e., M instead of N).

Figure 1B:
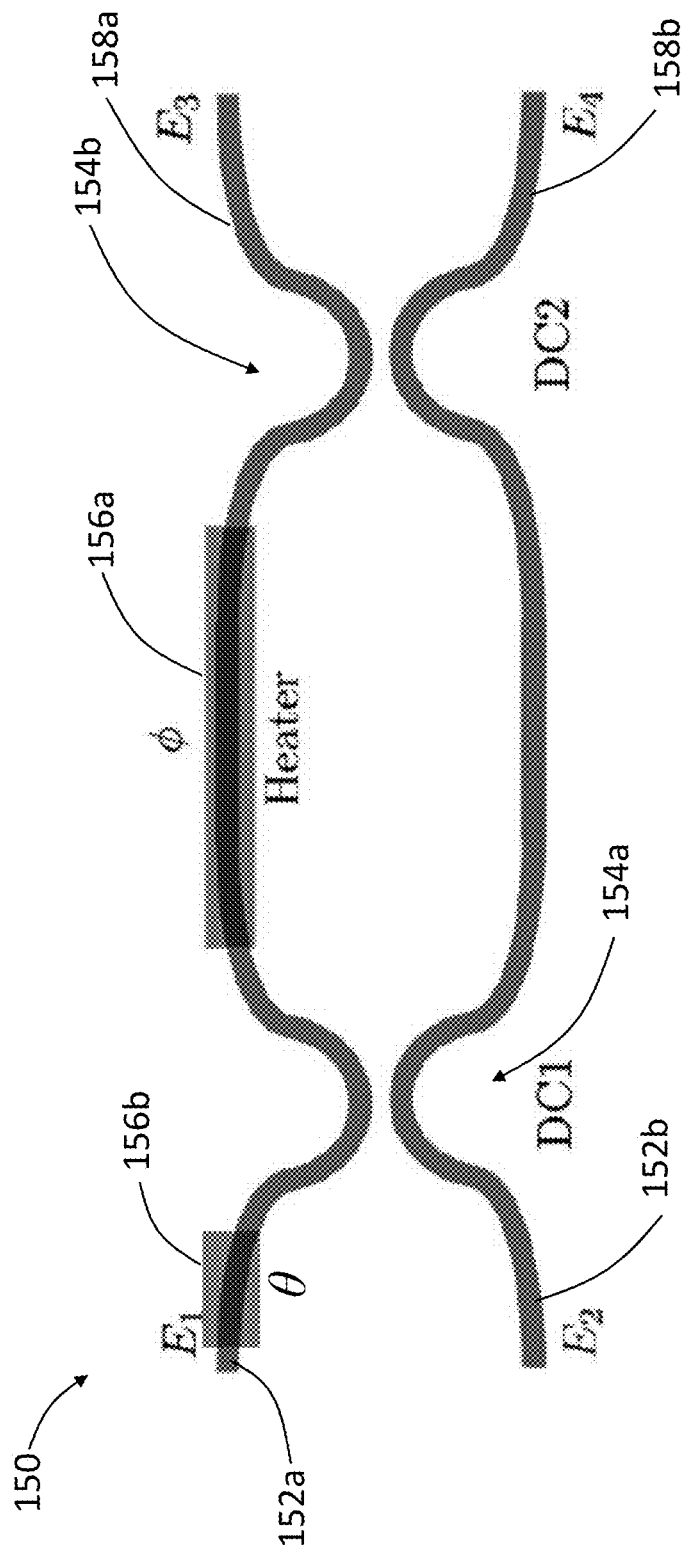
FIG. 1B shows a schematic of a reconfigurable beamsplitter (RBS) that can be used in the optical circuit in the method illustrated in FIG. 1A, according to an embodiment.

In some embodiments, each beamsplitter in the network of interconnected beamsplitters includes a 2×2 reconfigurable beamsplitter. FIG. 1B shows a schematic of a reconfigurable beamsplitter (RBS) 150 that can be used in the optical circuit in the method 100 illustrated in FIG. 1A. The RBS 150 includes a first directional coupler (DC1) 154a and a second direction coupler (DC2) 154b placed sequentially, with the relative optical phase φ (implemented by a first phase shifter 156a) between the intervening waveguides. In some embodiments, the first phase shifter 156a can include a thermo-optical phase shifter that can apply different amounts of phase shift via the electric current through the first phase shifter 156a. Other techniques of controlling this phase, such as electro-optic phase shifters, can also be used.

The RBS 150 also includes two input ports 152a and 152b, as well as two output ports 158a and 158b. In addition, a second phase shifter 156b is placed on one input 152a of the RBS 150. The two phase shifters 156a and 156b, via different phase settings, allow the RBS 150 to achieve an arbitrary split ratio, i.e., a tunable transmission between the input fields ($E_1$, $E_2$) and the output fields ($E_3$, $E_4$). In the transmissive state, $E_4$ is substantially equal to $E_1$ and $E_3$ is substantially equal to $E_2$. In the reflective state, $E_3$ is substantially equal to $E_1$ and $E_4$ is substantially equal to $E_2$. As used herein, A is "substantially equal to" B when the difference between A and B is 10% of A or less.

The direction of the beam path that traverses the target location can be defined in at least several ways. In some embodiments, the original optical circuit is configured to perform a unitary transformation to the N input optical modes. In these embodiments, the topology of the optical circuit can be characterized as a square having four end points, and the direction of the beam path can be defined by two end points that are diagonal to each other (see, e.g., FIGS. 2A-6B). In these embodiments, without loss of generality, the four end points of the optical circuit can be labelled as a northwest (NW) end point, a northeast (NE)

end point, a southwest (SW) end point, and a southeast (SE) end point. In addition, the beamsplitters in the optical circuit are oriented such that each beamsplitter has a left output towards the west side of the optical circuit and a right output towards the east side of the optical circuit (e.g., by placing the beamsplitter 150 illustrated in FIG. 1B into a vertical orientation). In some instances, the target location can be on the right output of a beamsplitter and the beam path can be defined by the NW end point and the SE end point, i.e., along the NW-SE direction (see, e.g., FIGS. 2A and 3A). In some instances, the target location can be on the left output of a beamsplitter and the beam path can be defined by the SW end point and the NE end point, i.e., along the SW-NE direction (see, e.g., FIGS. 4A and 5A).

In some embodiments, the direction of the beam path can be defined by two beamsplitters connected by a waveguide containing the target location (or the target location is in the beam path defined by the waveguide). In these embodiments, the topology of the interconnected beamsplitters in the optical circuit can be characterized as a two-dimensional (2D) array and each beamsplitter is an element in the 2D array.

In some embodiments, the locations of the second plurality of beamsplitters can be determined based on the intersection points between the beam path and the edge(s) of the optical circuit. For example, the beam path can intersect a first edge of the optical circuit at a first intersection point and intersect a second edge of the optical circuit at a second intersection point. In addition, the beam path is along a direction defined by a first end point (e.g., located at the end of the first edge) and a second end point (e.g., located at the end of the second edge). The second plurality of beamsplitters can then be located (i) along the first edge of the optical circuit between the first intersection point and the first end point and (ii) along the second edge of the optical circuit between the second intersection point and the second end point.

The reconfigured optical circuit is configured to perform a linear transformation on M input optical modes, where M is less than N. In some embodiments, M=N−n, where n is the number of imperfections mitigated by the method 100. In some instances, the optical circuit has one imperfection addressed by the method 100, and the reconfigured optical circuit is configured to perform linear transformations on (N−1) input optical modes. In some embodiments, additional beamsplitters (other than those in the first and second plurality of beamsplitters) can be configured into a fixed setting and accordingly additional isolation regions are defined. In these embodiments, the reconfigured optical circuit is configured to perform linear transformations on less than (N−n) optical modes. In some embodiments, the beamsplitters that are configured into a fixed setting can be reconfigured for another one or more times to, for example, circumvent other defects.

In some embodiments, the target location has an imperfection that affects more than one optical mode. For example, the imperfection can be located on a beamsplitter (instead of waveguides between two beamsplitters) and therefore can affect two optical modes (see, e.g., FIGS. 6A and 6B). In these embodiments, the imperfection is mitigated as follows. Two input waveguides of the affected beamsplitter are identified. Then a first beam path is identified as if an imperfection is located on the first input waveguide leading to the affected beamsplitter. Beamsplitters along the first beam are configured into the transmissive state and some beamsplitters along at least one edge of the optical circuit are configured into the reflective state (i.e., steps 110 and 120). Similarly, a second beam path is identified as if an imperfection is located on the second input waveguide leading to the affected beamsplitter. Beamsplitters along the second beam are configured into the transmissive state and some beamsplitters along at least one edge of the optical circuit are configured into the reflective state (i.e., repeat steps 110 and 120).

Figures 2A, 2B:
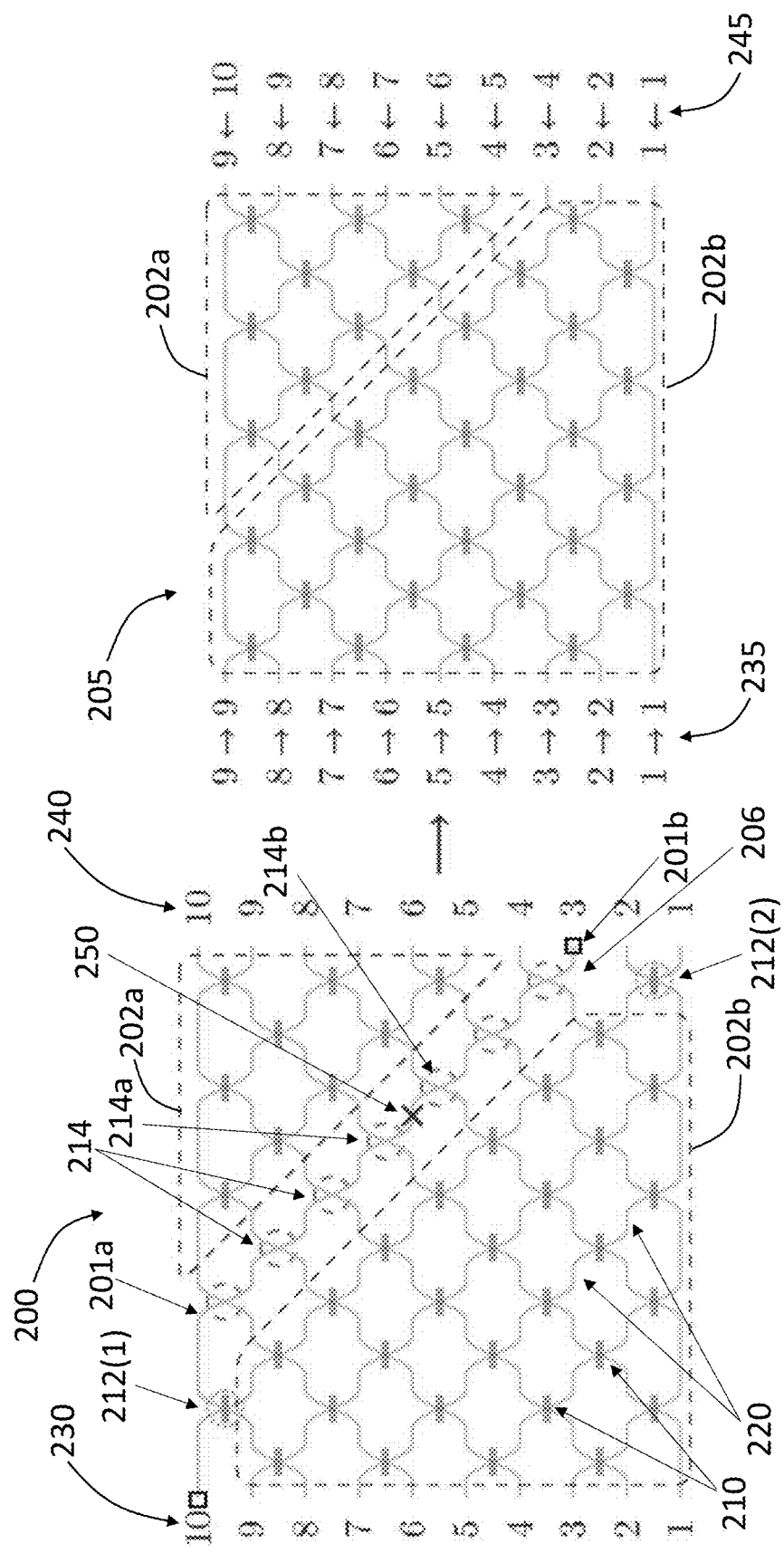
FIGS. 2A and 2B show a schematic of an original linear interferometer and a reconfigured linear interferometer, respectively, to illustrate a method of mitigating an imperfection located on a right output of a beamsplitter and above the principal diagonal of the original linear interferometer, according to an embodiment.

FIGS. 2A and 2B show a schematic of an original linear interferometer 200 and a reconfigured linear interferometer 205, respectively, to illustrate a method of mitigating an imperfection located on a right output of a beamsplitter and above the principal diagonal of the original linear interferometer 200, according to an embodiment. As used herein, an original linear interferometer (or optical circuit) refers to the linear interferometer (or optical circuit) before the method of mitigating imperfections is applied.

The original linear interferometer 200 includes a network of beamsplitters 210 (illustrated as rectangles) interconnected by waveguides 220. Each of the beamsplitters in the network of beamsplitters 210 can be substantially identical to the beamsplitter 150 shown in FIG. 1B and described above. The original linear interferometer 200 also includes input ports 230 to receive input optical modes and output ports 240 to send output optical modes. Ten input ports 230 and ten output ports 240 are illustrated in FIG. 2A for illustrative purposes only. In practice, the original linear interferometer 200 can include any other number of input ports and output ports.

The input ports 230 and/or output ports 240 can be waveguides that are also part of the beamsplitters 210. In some other instances, the input ports 230 and/or output ports 240 can include separate interfaces to receive and/or send optical modes.

In some embodiments, the original linear interferometer 200 includes a universal interferometer, which can be configured to perform an arbitrary linear transformation (including unitary transformations) on input optical modes. In these embodiments, the number of input optical modes is identical to the number of layers in the original linear interferometer 200 (also referred to as the depth of the original linear interferometer 200). Without being bound by any particular theory or mode of operation, the depth of a linear interferometer can be defined as the maximum number of beamsplitters that act on a given optical mode as the optical mode traverses the linear interferometer from input to output. For example, the depth of the original linear interferometer 200 is ten.

The original linear interferometer 200 includes an imperfection 250 (illustrated as an X) located on a right output of a beamsplitter 214a (also a left input of a subsequent beamsplitter 214b). In some embodiments, the imperfection 250 includes one or more lossy modes, which can be introduced into the original linear interferometer 200 during fabrication or use. For example, dust in the clean room where the original linear interferometer 200 is fabricated may stay onto or within the waveguide and create lossy modes. During use, dust (or other contaminants) attached to waveguides and damages (e.g., from mechanical, electrical, or optical forces) can also create lossy modes. These losses can cause the original linear interferometer 200 to perform linear transformations that deviate from the specified linear transformation and are difficult to analyze and exploit.

To mitigate and/or eliminate the effects of the imperfection 250, a beam path 206 traversing the imperfection 250 is identified. The direction of the beam path 206 can be defined by two beamsplitters 214a and 214b because the imperfection 250 is located on the waveguide that connects these two beamsplitters 214a and 214b. Alternatively or additionally, the direction of the beam path 206 can also be defined by the northwest end point (i.e., input port 10, also referred to as the first end point) and the southeast end point (i.e., output port 1, also referred to as the second end point), i.e., the direction of the beam path 206 is parallel to the line connecting input port 10 and output port 1.

The resulting beam path 206 also traverses a group of beamsplitters collectively labelled as 214 (including the beamsplitters 214a and 214b), which is illustrated as dashed circles that do not include rectangles. The beamsplitters 214 on the beam path 206 are configured into the transmissive state.

The beam path 206 intersects with the top edge of the original linear interferometer 200 at a first intersection point 201a and intersects with the right edge of the original linear interferometer 200 at a second intersection 201b. As described herein, the beam path 206 is along the NW-SE direction defined by the input port 10 and output port 1. The beamsplitter 212(1) located between the first intersection point 201a and the first end point (i.e., input port 10), as well as the beamsplitter 212(2) located between the second intersection point 201b and the second end point (i.e., output port 1), are configured into the reflective state. This group of beamsplitters 212(1) and 212(2) are illustrated as dashed circles including a rectangle.

In some embodiments, the reconfiguration of the original linear interferometer 200 can also include identifying one input port 10 (illustrated as a square box) and one output port 3 (illustrated as a square box). The output port 3 is identified due to its intersection with the beam path 206. The input port 10 is identified because it is one end point that can be used to define the direction of the beam path 206 and is located on the edge where the first intersection point 201a is located. In some embodiments, these two ports can be configured into inactive states (i.e., unused states). In some embodiments, the identified input port 10 and output 3 can be physically blocked to avoid any input optical mode into the input port 10.

The above reconfiguration of the original linear interferometer 200 divides the original linear interferometer 200 into three regions. The first region 202a and the second region 202b (i.e., marked within dashed lines) include beamsplitters 201 that are still fully reconfigurable. The third region includes beamsplitters 212(1) and 212(2) that are configured into the reflective state, beamsplitters 214 that are configured into the transmissive state, input port 10, and output port 3. With this setting, any light that is impinged at the input ports 1 to 9 does not interact with the imperfection 250 and is emitted from output ports 1-2 and 4-10 only (i.e., not from output port 3). On the other hand, any light that is impinged (received) at input port 10 passes through the imperfection 250 and is emitted by the output port 3 (and only by the output port 3). In other words, the third region is an isolated region that does not participate in the linear transformation performed by the rest of the original linear interferometer 200. The first region 202a and the second region 202b effectively form the reconfigured linear interferometer 205 as illustrated in FIG. 2B.

The reconfigured linear interferometer 205, in addition to the regions 202a and 202b, also includes relabeled input ports 235 and relabeled output ports 245. The input ports 230 and output ports 240 of the original linear interferometer 200 are relabeled since one input port 10 and one output port 3 are effectively configured into the inactive state. Due to this setting, the relabeled input ports 235 has 9 ports (i.e., input ports 1-9) that are the same as input ports 1-9 in the original input ports 230. The relabeled output ports 245 also has 9 ports, with output ports 1-2 the same as output ports 1-2 in the original output ports 240. Output ports 3-9 in the relabeled output ports 245 correspond to output ports 4-10 in the original output ports 240. The detailed relabeling of the original input ports 230 and the original output ports 240 is illustrated in FIG. 2B as m→n and n←m respectively, where m is the original port label and n is the new port label for the reconfigured linear interferometer 205.

The reconfigured linear interferometer 205 is substantially identical to the original linear interferometer 200 and is configured to implement a linear transformation on 9 input optical modes (instead of 10 optical modes in the original linear interferometer 200). In other words, the original linear interferometer 200 is reconfigured into a slightly smaller scale linear interferometer after the imperfection 250 is addressed. Therefore, the approach illustrated in FIGS. 2A-2B allows the continued use (or reuse) of the original linear interferometer 200 despite the presence of the imperfection 250. Such reuse is achieved by circumventing the imperfection 250 because input optical modes for the reconfigured optical circuit 205 do not reach the imperfection 250 whereas the remaining optical components (including the remaining beamsplitters 210 and waveguides 220) are configured to implement an effectively smaller linear interferometer (i.e., the reconfigured linear interferometer 205).

Figures 3A, 3B:
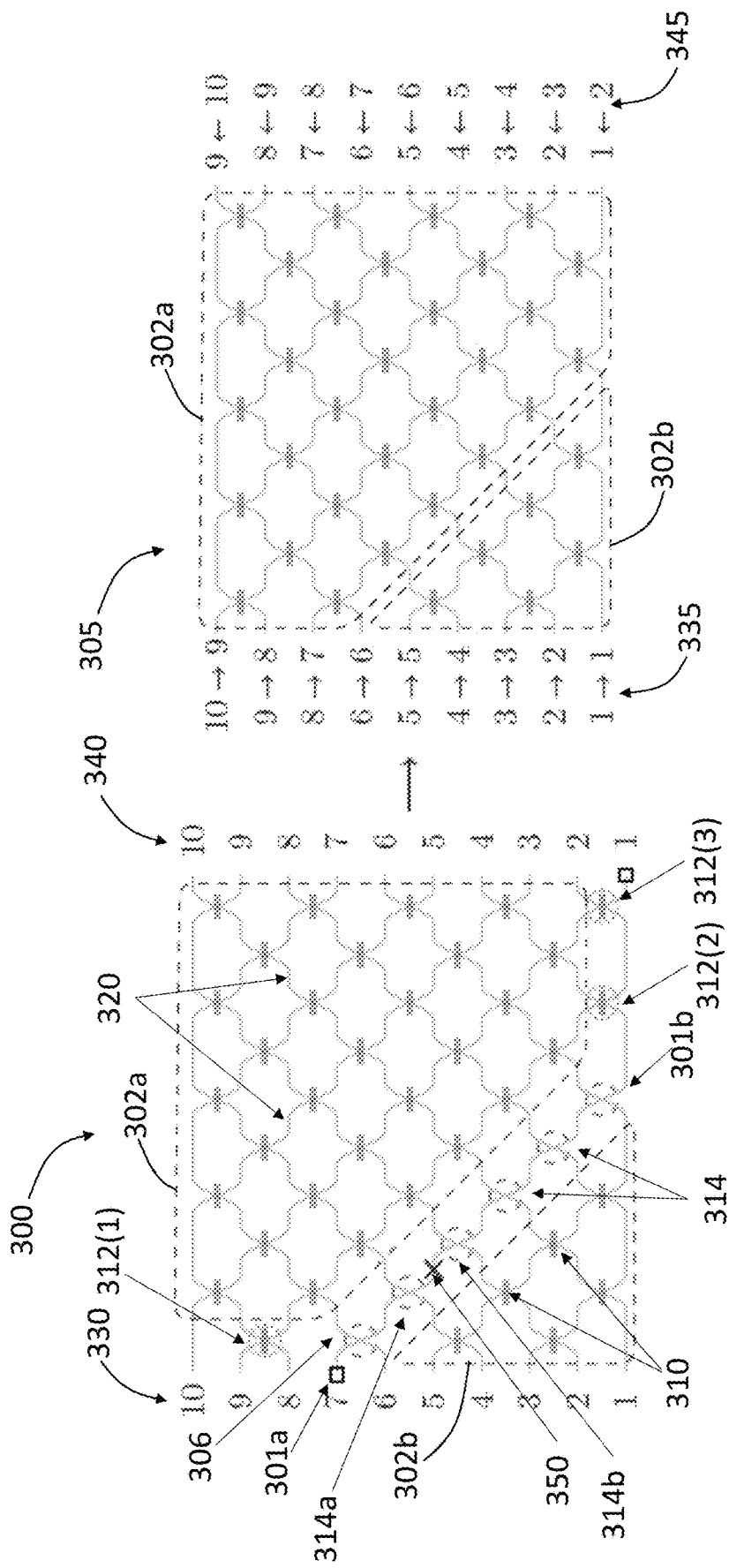
FIGS. 3A and 3B show a schematic of an original linear interferometer and a reconfigured linear interferometer, respectively, to illustrate a method of mitigating an imperfection located on a right output of a beamsplitter and below the principal diagonal of the original linear interferometer, according to an embodiment.

FIGS. 3A and 3B show a schematic of an original linear interferometer 300 and a reconfigured linear interferometer 305, respectively, to illustrate a method of mitigating an imperfection located on a right output of a beamsplitter and below the principal diagonal of the original linear interferometer, according to an embodiment. The original linear interferometer 300 includes a network of beamsplitters 310 interconnected by waveguides 320, a plurality of input ports 330 (labelled as 1 to 10), and a plurality of output ports 340 (labelled as 1 to 10). The original linear interferometer 300 also includes an imperfection 350 located on the right output of a beamsplitter 314a (also on the left input of a subsequent beamsplitter 314b).

The procedure to mitigate the effects from the imperfection 350 can be similar to the procedure described above with reference to FIGS. 2A and 2B. More specifically, a beam path 306 traversing the imperfection 350 is identified. The direction of the beam path can be defined by the two beamsplitters 314a and 314b that sandwich the imperfection 350. Alternatively, or additionally, the direction of the beam path 306 can be defined by input port 10 (i.e., first end point) and output port 1 (i.e., second end point). Beamsplitters 314 on the beam path 306 are configured into the transmissive state (illustrated as dashed circles including no rectangle inside).

The beam path 306 intersects with the left edge of the original linear interferometer 300 at a first intersection point 301a and intersects with the bottom edge of the original linear interferometer 300 at a second intersection point 301b. The first intersection point 301a is also input port 7. Beamsplitter 312(1), located between the first intersection point 301a and the first end point (i.e., input port 10), and beamsplitters 312(2)/312(3) located between the second intersection point 301b and the second end point (i.e., output port 1), are configured into the reflective state. In addition, input port 7 and output port 1 can be configured into inactive states.

The reconfiguration above divides the original linear interferometer 300 into three regions. The first region 302a and the second region 302b include beamsplitters 310 that are still reconfigurable to implement linear transformation on nine input optical modes. The third region includes beamsplitters 314 on the beam path 306 and beamsplitters 312(1) to 312(3) on the edges of the original linear interferometer 300. Beamsplitters in the third region have fixed settings (i.e., not reconfigurable) and are not used to implement linear transformations on input optical modes in the reconfigured linear interferometer 305.

FIG. 3B shows the schematic of the reconfigured linear interferometer 305 after the reconfiguration described above. The reconfigured linear interferometer 305, in addition to the regions 302a and 302b, also includes relabeled input ports 335 and relabeled output ports 345. The input ports 330 and output ports 340 of the original linear interferometer 300 are relabeled since one input port 7 and one output port 1 are effectively configured into the inactive state. Due to this setting, the relabeled input ports 335 have 9 ports, with input ports 1-6 the same as input ports 1-6 in the original input ports 330. Input ports 7-9 in the relabeled input ports 335 correspond to input ports 8-10 in the original input ports 330. The relabeled output ports 345 also have 9 ports (i.e., output ports 1-9) that are identical to output ports 2-10 in the original output ports 340. The detailed relabeling of the original input ports 330 and the original output ports 340 is illustrated in FIG. 3B as m→n and n←m respectively, where m is the original port label and n is the new port label for the reconfigured linear interferometer 405.

Figures 4A, 4B:
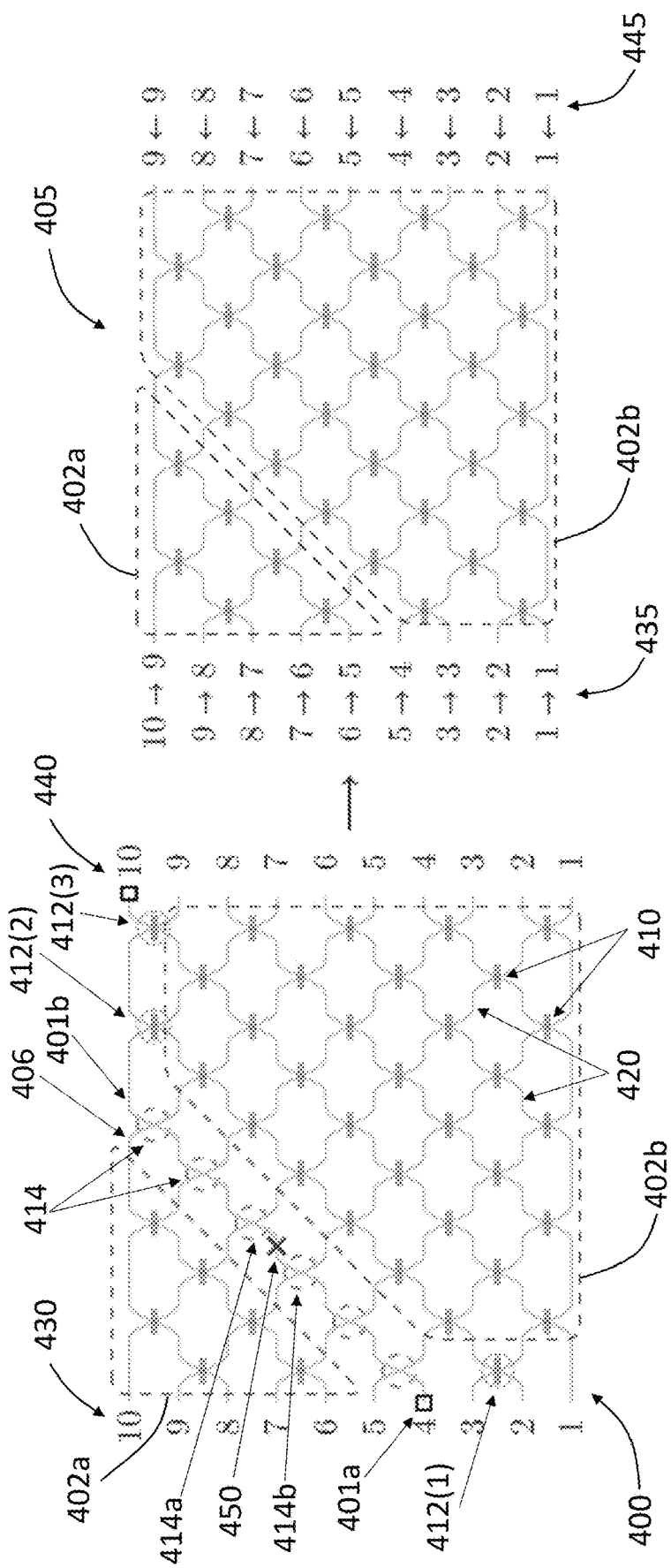
FIGS. 4A and 4B show a schematic of an original linear interferometer and a reconfigured linear interferometer, respectively, to illustrate a method of mitigating an imperfection located on a left output of a beamsplitter and above the principal diagonal of the original linear interferometer, according to an embodiment.

FIGS. 4A and 4B show a schematic of an original linear interferometer 400 and a reconfigured linear interferometer 405, respectively, to illustrate a method of mitigating an imperfection located on a left output of a beamsplitter and above the principal diagonal of the original linear interferometer, according to an embodiment. The original linear interferometer 400 includes a network of beamsplitters 410 interconnected by waveguides 420, a plurality of input ports 430 (labelled as 1 to 10), and a plurality of output ports 440 (labelled as 1 to 10). The original linear interferometer 400 also includes an imperfection 450 located on the left output of a beamsplitter 414a (also the right input of a subsequent beamsplitter 414b).

Compared to the linear interferometers 200, where the imperfection 250 is located on the right output of the beamsplitter 214a, the imperfection 450 in the linear interferometer 400 is located on the left output of the beamsplitter 414a. Such a difference in the location of the imperfection to be mitigated results in different directions of the beam path on which beamsplitters are configured into fixed settings. More specifically, in the original linear interferometer 400, a beam path 406 is defined based on the direction defined by the beamsplitters 414a and 414b, i.e., along the SW-NE direction (instead of the NW-SE direction in FIG. 2A). Alternatively, the direction of the beam path 406 can also be defined by input port 1 (i.e., first end point of the original interferometer 400) and output port 10 (i.e., second end point of the original interferometer 400). Beamsplitters 414 on the beam path 406 (including beamsplitters 414a and 414b) are configured into the transmissive state (illustrated as dashed circles including no rectangle inside).

The beam path 406 intersects with the left edge of the original linear interferometer 400 at a first intersection point 401a and intersects with the top edge of the original linear interferometer 400 at a second intersection point 401b. The first intersection point 401a is also input port 4. Beamsplitter 412(1) located between the first intersection point 401a and the first end point (i.e., input port 1), and beamsplitters 412(2)/412(3) located between the second intersection point 401b and the second end point (i.e., output port 10), are configured into the reflective state. In addition, input port 4 and output port 10 can be configured into inactive states.

The reconfiguration above divides the original linear interferometer 400 into three regions. The first region 402a and the second region 402b include beamsplitters 410 that are still reconfigurable to implement linear transformations on nine input optical modes. The third region includes beamsplitters 414 on the beam path 406 and beamsplitters 412(1) to 412(3) on the edges of the original linear interferometer 400. Beamsplitters in the third region have fixed settings (i.e., not reconfigurable) and are not used to implement linear transformations on input optical modes.

FIG. 4B shows the schematic of the reconfigured linear interferometer 405 after the reconfiguration described above. The reconfigured linear interferometer 405, in addition to the regions 402a and 402b, also includes relabeled input ports 435 and relabeled output ports 445. The input ports 430 and output ports 440 of the original linear interferometer 400 are relabeled since one input port 4 and one output port 10 are effectively configured into the inactive state. Due to this setting, the relabeled input ports 435 have 9 ports, with input ports 1-3 the same as input ports 1-3 in the original input ports 430. Input ports 4-9 in the relabeled input ports 435 correspond to input ports 5-10 in the original input ports 430. The relabeled output ports 445 also have 9 ports (i.e., output ports 1-9) that are identical to output ports 1-9 in the original output ports 440. The detailed relabeling of the original input ports 430 and the original output ports 440 is illustrated in FIG. 4B as m→n and n←m respectively, where m is the original port label and n is the new port label for the reconfigured linear interferometer 405.

Figures 5A, 5B:
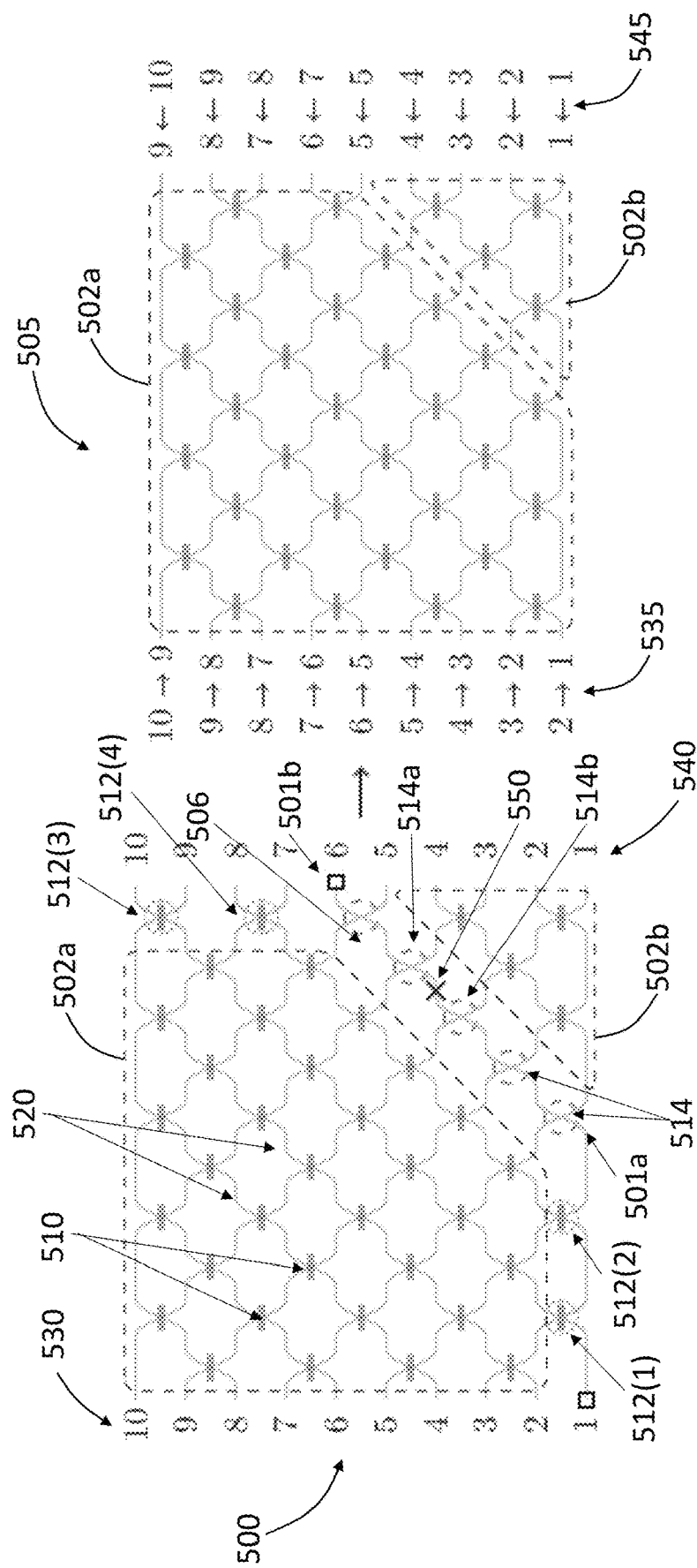
FIGS. 5A and 5B show a schematic of an original linear interferometer and a reconfigured linear interferometer, respectively, to illustrate a method of mitigating an imperfection located on a left output of a beamsplitter and below the principal diagonal of the original linear interferometer, according to an embodiment.

FIGS. 5A and 5B show a schematic of an original linear interferometer 500 and a reconfigured linear interferometer 505, respectively, to illustrate a method of mitigating an imperfection located on a left output of a beamsplitter and below the principal diagonal of the original linear interferometer, according to an embodiment. The original linear interferometer 500 includes a network of beamsplitters 510 interconnected by waveguides 520, a plurality of input ports 530 (labelled as 1 to 10), and a plurality of output ports 540 (labelled as 1 to 10). The original linear interferometer 500 also includes an imperfection 550 located on the left output of a beamsplitter 514a (also the right input of a subsequent beamsplitter 514b).

The procedure to mitigate the imperfection 550 for the original linear interferometer 500 is substantially similar to the procedure described with reference to FIGS. 4A and 4B. More specifically, a beam path 506 is defined based on the direction defined by the beamsplitters 514a and 514b, i.e., along the SW-NE direction. Alternatively, the direction of the beam path 506 can also be defined by input port 1 (i.e., first end point of the original interferometer 500) and output port 10 (i.e., second end point of the original interferometer 500). Beamsplitters 514 on the beam path 506 (including beamsplitters 514a and 514b) are configured into the transmissive state (illustrated as dashed circles including no rectangle inside).

The beam path 506 intersects with the bottom edge of the original linear interferometer 500 at a second intersection point 501a and interacts with the right edge of the original linear interferometer 500 at a second intersection point 501b. The second intersection point 501b is also output port 6. Beamsplitters 512(1)/512(2) located between the first intersection point 501a and the first end point (i.e., input port 1), and beamsplitters 512(3)/512(4) located between the second intersection point 501b and the second end point (i.e., output port 10), are configured into the reflective state. In addition, input port 1 and output port 6 can be configured into inactive states.

The reconfiguration above divides the original linear interferometer 500 into three regions. The first region 502a and the second region 502b include beamsplitters 510 that are still reconfigurable to implement linear transformations on nine input optical modes. The third region includes beamsplitters 514 on the beam path 506 and beamsplitters 512(1) to 512(4) on the edges of the original linear interferometer 500. Beamsplitters in the third region have fixed settings (i.e., not reconfigurable) and are not used to implement linear transformations on input optical modes.

FIG. 5B shows the schematic of the reconfigured linear interferometer 505 after the reconfiguration described above. The reconfigured linear interferometer 505, in addition to the regions 502a and 502b, also includes relabeled input ports 535 and relabeled output ports 545. The input ports 530 and output ports 540 of the original linear interferometer 500 are relabeled since one input port 1 and one output port 6 are effectively configured into the inactive state. Due to this setting, the relabeled input ports 535 have 9 ports (i.e., input ports 1-9) that are identical to input ports 2-10 in the original input ports 530. The relabeled output ports 545 also have 9 ports (i.e., output ports 1-9), with output ports 1-5 the same as output ports 1-5 in the original output ports 430. Output ports 6-9 in the relabeled output ports 545 correspond to input ports 7-10 in the original output ports 540. The detailed relabeling of the original input ports 530 and the original output ports 540 is illustrated in FIG. 5B as m→n and n←m respectively, where m is the original port label and n is the new port label for the reconfigured linear interferometer 505.

In FIGS. 2A-5B, one imperfection is illustrated in each optical circuit (e.g., 200, 300, 400, and 500). The reuse approach described herein, however, can be used to mitigate multiple imperfections as well. Without loss of generality, it is assumed that each imperfection affects only one optical mode. For an imperfection that affects multiple optical modes, the imperfection can be treated as multiple single-mode imperfections (see, e.g., FIGS. 6A-6B below).

To mitigate the effects of multiple imperfections, a respective beam path is identified for each imperfection, i.e., the beam path traverses the imperfection and is along the direction defined by two beamsplitters that sandwich the imperfection or by two end points that are diagonal to each other. Beamsplitters on each beam path are configured into the transmissive state. In addition, beamsplitters that are between an intersection point and an end point that defines the direction of each beam path are configured into the reflective state. In the event that a beamsplitter is configured into the transmissive state to mitigate one imperfection and configured into the reflective state to mitigate another imperfection, i.e., conflicting settings, the beamsplitter can be configured into either the reflective state or the transmissive state because either setting can isolate the beamsplitter from the rest of the optical circuit.

For each imperfection on a distinct beam path, the mitigation procedure usually configures one input and one output into the inactive state, thereby reducing the dimension of the optical circuit by one. Therefore, for a total of n imperfections in an N-mode optical circuit, the reconfigured optical circuit is an (N−n)-mode optical circuit.

FIGS. 6A and 6B show a schematic of an original linear interferometer 600 and a reconfigured linear interferometer 605, respectively, to illustrate a method of mitigating an imperfection that affects multiple optical modes, according to an embodiment. The original linear interferometer 600 includes a network of beamsplitters 610 interconnected by waveguides 620, a plurality of input ports 630 (labelled as 1 to 12), and a plurality of output ports 640 (labelled as 1 to 12). The original linear interferometer 600 also includes an imperfection 650 located on a beamsplitter. Since the imperfection 650 is located on the crossing section of waveguides, the imperfection 650 affects at least two optical modes (e.g., two input optical modes into the beamsplitter).

In some embodiments, the imperfection 650 includes an unresponsive optical component (e.g., a beam-splitter or a phase-shifter). This type of imperfection or defect can result from faulty classical control of the optical component, including, for example, dysfunctional thermo-optic phase-shifters or damaged connections between the optical component and the control unit.

The method to mitigate the effects of the imperfection 650 is performed by treating the imperfection 650 as two single-mode imperfections 655a and 655b. The imperfection 655a is located on the left input of the affected beamsplitter and the imperfection 655b is located on the left output of the affected beamsplitter. Other treatments of the imperfection 650 can also be used. For example, the imperfection 650 can also be treated as a first single-mode imperfection on the right input and a second single-mode imperfection on the right output. Alternatively, the imperfection 650 can also be treated as a first single imperfection on the left input (output) and a second single imperfection on the right input (output). These selections can result in the same beam paths as described below.

A first beam path 606a is illustrated in FIG. 6A to mitigate the imperfection 655a. The first beam path 606a can be determined using any of the methods described herein. Beamsplitters 614a on the beam path 606a are configured into the transmissive state. Beamsplitters 612a between intersections points and end points that can be used to define the direction of the beam path 606a (i.e., input port 12 and output port 1) are configured into the reflective state. Input port 8 (i.e., intersection point between the beam path 606a and the left edge of the original linear interferometer 600) and output port 1 (i.e., one end point that can be used to define the direction of the beam path 606a) can be configured into the inactive state.

The mitigation of the imperfection 650 also includes identifying a second beam path 606b that traverses the second imperfection 655b. The second beam path 606b can be determined using any of the methods described herein. Beamsplitters 614b on the beam path 606b are configured into the transmissive state. Beamsplitters 612b between intersections points and end points that can be used to define the direction of the beam path 606b (i.e., input port 1 and output port 12) are configured into the reflective state. Input port 1 (i.e., one end point that can be used to define the direction of the beam path 606b) and output port 11 (i.e., intersection point between the beam path 606b and the right edge of the original linear interferometer 600) can be configured into the inactive state.

The reconfiguration above divides the original linear interferometer 600 into five regions. The first four regions 602a, 602b, 602c, and 602d include beamsplitters 610 that are still reconfigurable to implement linear transformation on ten input optical modes. The fifth region includes beamsplitters 614a/b on the beam paths 606a/b and beamsplitters 612a/b on the edges of the original linear interferometer 600. Beamsplitters in this region have fixed settings (i.e., not reconfigurable) and are not used to implement linear transformations on input optical modes.

FIG. 6B shows the schematic of the reconfigured linear interferometer 605 after the reconfiguration described above. The reconfigured linear interferometer 605, in addition to the regions 602a to 602d, also includes relabeled input ports 635 and relabeled output ports 645. The relabeled input ports 635 also have 10 ports (i.e., input ports 1-10), where the input ports 1-6 correspond to input ports 2-7 in the original input ports 630 and input ports 7-10 correspond to input ports 9-12 in the original input ports 630. The relabeled output ports 645 have 10 ports (i.e., output ports 1-10), where output ports 1-9 correspond to output ports 2-10 in the original output ports 640 and output port 10 corresponds to output port 12 in the original output ports 640. The detailed relabeling of the original input ports 630 and the original output ports 640 is illustrated in FIG. 6B as m→n and n←m respectively, where m is the original port label and n is the new port label for the reconfigured linear interferometer 605.

Figures 7A, 7B:
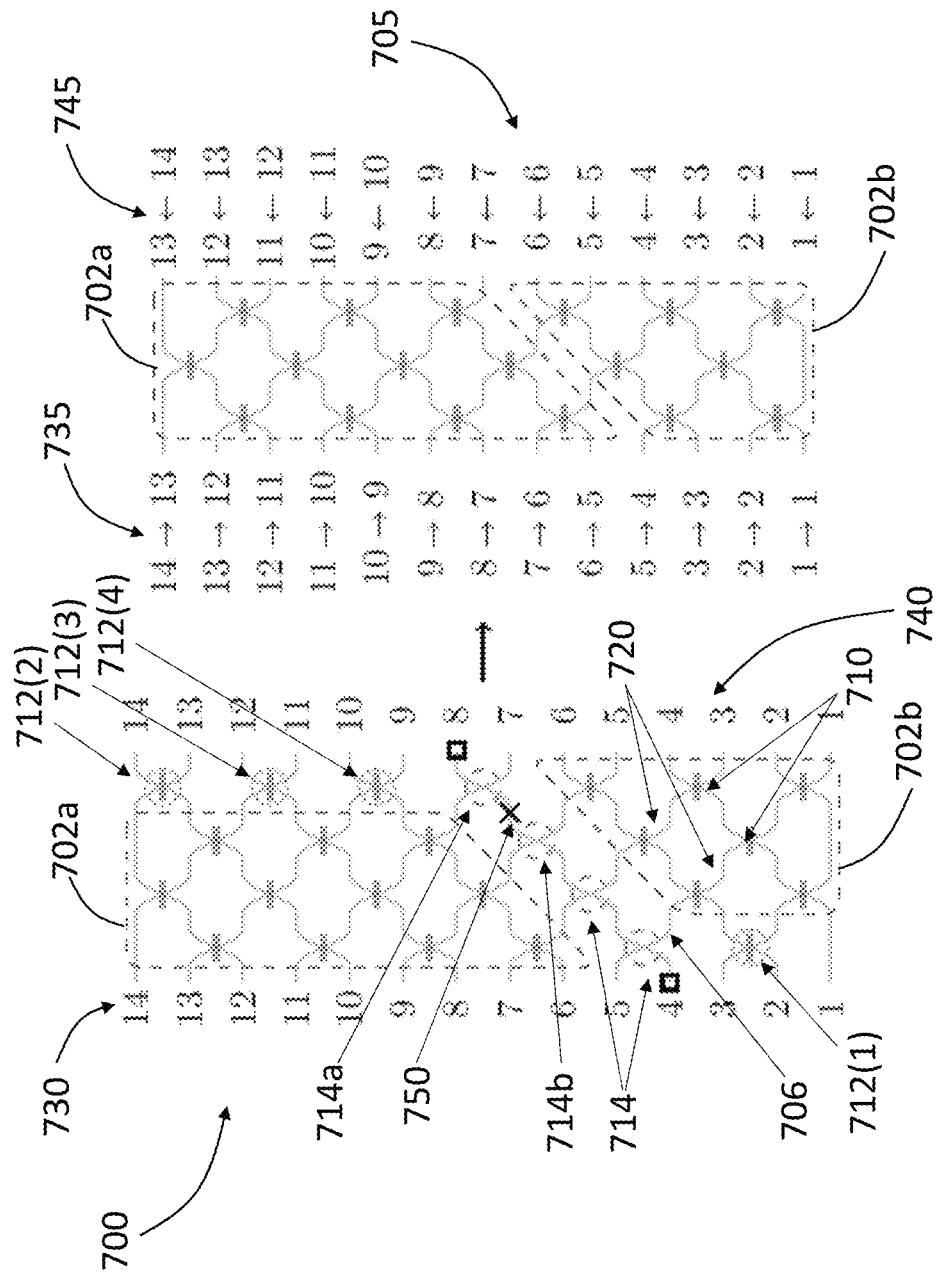
FIGS. 7A and 7B show a schematic of an original linear interferometer and a reconfigured linear interferometer, respectively, to illustrate a method of mitigating an imperfection in a shallow optical circuit, according to an embodiment.

FIGS. 7A and 7B show a schematic of an original linear interferometer 700 and a reconfigured linear interferometer 705, respectively, to illustrate a method of mitigating an imperfection in a shallow optical circuit, according to an embodiment. The original linear interferometer 700 includes a network of beamsplitters 710 interconnected by waveguides 720, a plurality of input ports 730 (labelled as 1 to 14), and a plurality of output ports 740 (labelled as 1 to 14). The depth of the original linear interferometer 700 is four, which is the maximum number of beamsplitters an input optical mode traverses within the original linear interferometer 700. As illustrated in FIG. 7A, the depth of the original linear interferometer 700 is less than the number of input optical modes, which is fourteen. Therefore, such an interferometer is also referred to as a shallow interferometer or a shallow optical circuit. Shallow circuits can be used in, for example, generation of tensor-network states of light.

The original linear interferometer 700 also includes an imperfection 750 located on the left output of a beamsplitter 714a (also the right input of a subsequent beamsplitter 714b). To address the imperfection 750, a beam path 706 traversing the imperfection 750 is determined. The direction of the beam path 706 is defined by the two beamsplitters 714a and 714b that sandwich the imperfection 750. The beam path 706 also traverses beamsplitters collectively labelled as 714 (including beamsplitters 714a and 714b), which are configured into the transmissive state.

Since the topology of the original linear interferometer 700 is a rectangle (instead of a square as in FIGS. 2A-6B), the direction of the beam path 706 is not exactly parallel with the direction defined by input port 1 and output port 14, which are two end points diagonal to each other. The direction of the beam path 706, however, is still roughly along the SW-NE direction. Therefore, the two end points, i.e., input port 1 and output port 14, can still be used as the references points to determine which beamsplitters are configured into fixed settings as described below.

The beam path 706 intersects with the left edge of the original linear interferometer 700 at a first intersection point, i.e., input port 4, and intersects with the right edge of the original linear interferometer 700 at a second intersection point, i.e., output port 8. Beamsplitters 712(1) located between the first intersection point (i.e., input port 4) and the first end point (i.e., input port 1), as well as beamsplitters 712(2) to 712(4) located between the second intersection point (i.e., output port 8) and the second end point (i.e., output port 14), are configured into the reflective state. In addition, the input port 4 and the output port 8 can be configured into the inactive state.

The reconfiguration above divides the original linear interferometer 700 into three regions. The first two regions 702a and 702b include beamsplitters 710 that are still reconfigurable to implement linear transformations on ten input optical modes. The third region includes beamsplitters 714 on the beam paths 706 and beamsplitters 712(1) to 712(4) on the edges of the original linear interferometer 700. Beamsplitters in this region have fixed settings (i.e., not reconfigurable) and are not used to implement linear transformations on input optical modes.

FIG. 7B shows the schematic of the reconfigured linear interferometer 705 after the reconfiguration described above. The reconfigured linear interferometer 705, in addition to the regions 702a and 702b, also includes relabeled input ports 735 and relabeled output ports 745. The relabeled input ports 735 have 13 ports (i.e., input ports 1-13), where the input ports 1-3 correspond to input ports 1-3 in the original input ports 730 and input ports 4-13 correspond to input ports 5-14 in the original input ports 730. The relabeled output ports 745 have 13 ports (i.e., output ports 1-13), where output ports 1-7 correspond to output ports 1-7 in the original output ports 740 and output port 8-13 corresponds to output ports 9-14 in the original output ports 740. The detailed relabeling of the original input ports 730 and original output ports 740 is illustrated in FIG. 7B as m→n and n←m respectively, where m is the original port label and n is the new port label for the reconfigured linear interferometer 705. The reconfigured linear interferometer 705 remains a shallow circuit because the depth of the reconfigured linear interferometer 705 is now three, which is less than the number of input modes (i.e., 13).

Figure 8:
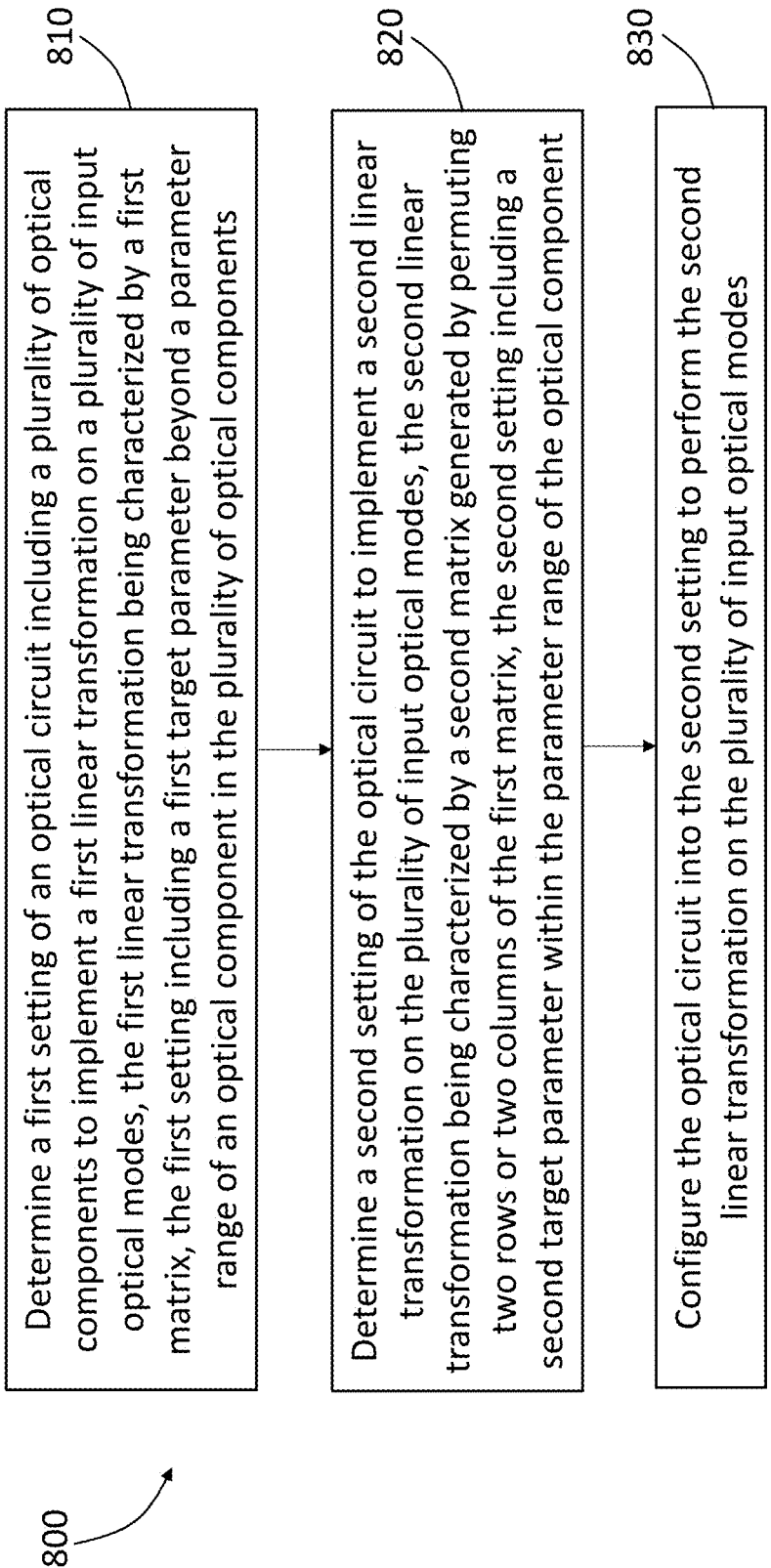
FIG. 8 is a flowchart illustrating a method of addressing optical components having a compromised parameter range, according to an embodiment.

FIG. 8 is a flowchart illustrating a method 800 of addressing optical components having a compromised parameter range, according to an embodiment. The method 800 includes, at 810, determining a first setting of an optical circuit including a plurality of optical components to implement a first linear transformation on a plurality of input optical modes. The first linear transformation is characterized by a first matrix. The first setting includes a first target parameter beyond a parameter range of an optical component in the plurality of optical components.

The method 800 also includes, at 820, determining a second setting of the optical circuit to implement a second linear transformation on the plurality of input optical modes. The second linear transformation is characterized by a second matrix generated by permuting two rows or two columns of the first matrix. The second setting includes a second target parameter within the parameter range of the optical component. At 830, the optical circuit is configured into the second setting to perform the second linear transformation on the plurality of input optical modes. Since the second linear transformation is only a permuted version of the first linear transformation, the results achieved by the second linear transformation can be converted into results that would have been achieved by the first linear transformation by post-processing, such as relabeling the input/output ports of the optical circuit. In other words, permuting the matrix of a linear transformation does not change the substance of the linear transformation.

In some embodiments, the step 820 may not generate a setting that allows the optical component to operate within its parameter range. In these embodiments, the step 820 can be repeated as many times as needed, until an appropriate setting is found.

In some embodiments, the method 800 can be implemented by a controller. For example, the controller can be used to find out the second setting and send a control signal to the optical circuit to implement the second setting. In addition, the controller can also be used to determine whether the second setting can be implemented by the optical circuit, i.e., whether every optical component in the optical circuit operates within its parameter range in order to implement the second setting. The controller can be further configured to relabel the input/output ports of the optical circuit. For example, the controller can update a table listing the numbering of the input/output ports saved in a memory.

The controller can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

In some embodiments, the optical circuit includes a network of interconnected beamsplitters (e.g., similar to the beamsplitter 150 shown in FIG. 1B). In some embodiments, the optical circuit includes a linear interferometer (e.g., as illustrated in FIGS. 2A-7B) and the optical component that has a compromised parameter range is a beamsplitter having an extinction ratio different from its specification. For a linear interferometer, the numbering (or labeling) of light sources (also referred to as sources, such as lasers, optical parametric amplifiers, or any other appropriate light source) connected to the input ports of the linear interferometer is interchangeable amongst themselves. The numbering (or labeling) of detectors connected to the output ports of the linear interferometer is also interchangeable among themselves. In other words, any permutation of the source indices (also referred to as numbering or labeling) with each other can be performed outside the linear interferometer. Similarly, any permutation of detector indices can also be performed outside the linear interferometer. These permutations can be accounted for using classical control of the sources and classical post-processing of the detection outputs.

The flexibility of permuting the sources and detectors translates to flexibility in permuting the rows and columns of the unitary matrix implemented by the linear interferometer. Given an N×N unitary matrix U to be implemented using a linear interferometer, step 820 in the method 800 can be implemented as follows. First, two elements are sampled from a permutation group S(N) acting on N objects. Each element in the permutation group can represent a row or a column in the matrix. Then the permutations are applied to the rows and/or columns of the matrix U. Based on permutation, the setting of the linear interferometer (e.g., the transmission ratio of each beamsplitter in the linear interferometer) is determined. If the determined ratio of the beamsplitter at issue is still beyond the range of ratios that is achievable by the beamsplitter, the above steps are repeated with new permutations.

If, on the other hand, the determined ratio is within the range of ratios achievable by the beamsplitter, then the sources at the input ports are also permuted according to the permutation of rows in the matrix U. If the permutation is performed on the columns of the matrix, then the detectors at the output ports are permuted accordingly. With this permutation, the second linear transformation generates identical measurement outcomes compared to the first linear transformation whereas the issue of a limited extinction ratio of the beamsplitter is addressed.

In a linear interferometer configured to process N input optical modes, the number of possible permutations is N!×N!, which is usually a large number. Therefore, it is highly likely that at least one pair of permutations can result in a setting of the linear interferometer that can be implemented by the beamsplitter at issue.

The method 800 addresses the imperfection in the optical component without deactivating any optical component in the optical circuit and therefore is highly cost effective. Alternatively, the optical component having the compromised parameter range can also be circumvented using methods described with reference to FIGS. 2A-7B. In these embodiments, the optical component at issue is configured into the inactive state. This approach may be used when no permutation results in a proper setting for the optical component.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    configuring a first plurality of beamsplitters in a network of interconnected beamsplitters of an optical circuit into a transmissive state, the optical circuit configured to perform a linear transformation of N input optical modes, N being a positive integer, the first plurality of beamsplitters being located along a beam path within the optical circuit and traversing a target location, the target location identifying an imperfection in the optical circuit; and
    configuring a second plurality of beamsplitters in the network of interconnected beamsplitters of the optical circuit into a reflective state to reconfigure the optical circuit into a reconfigured optical circuit that circumvents the imperfection, the second plurality of beamsplitters being located along at least one edge of the optical circuit,
    wherein the first plurality of beamsplitters and the second plurality of beamsplitters define a region of the optical circuit, the region includes the target location, and the reconfigured optical circuit is configured to perform a linear transformation on M input optical modes independent of the region, M being a positive integer less than N.

2. The method of claim 1, wherein each beamsplitter in the network of interconnected beamsplitters includes a 2×2 reconfigurable beamsplitter.

3. The method of claim 1, wherein the beam path is along a direction defined by a first end point of the optical circuit and a second end point of the optical circuit.

4. The method of claim 1, wherein:
    the beam path is along a direction defined by a first end point of the optical circuit and a second end point of the optical circuit, the beam path intersecting with a first edge of the optical circuit at a first intersection point and intersecting with a second edge of the optical circuit at a second intersection point, and
    the second plurality of beamsplitters are located: (i) along the first edge of the optical circuit between the first intersection point and the first end point and (ii) along the second edge of the optical circuit between the second intersection point and the second end point.

5. The method of claim 1, wherein M=N−1.

6. The method of claim 1, wherein the target location is on a waveguide connecting a first beamsplitter and a second beamsplitter in the network of interconnected beamsplitters, and the beam path is along a direction defined by the first beamsplitter and the second beamsplitter, wherein the first and second beamsplitters are included in the first plurality of beamsplitters.

7. The method of claim 1, wherein:
    the target location is on a target beamsplitter in the network of interconnected beamsplitters, the target beamsplitter configured to receive a first input from a first beamsplitter and a second input from a second beamsplitter,
    the beam path having a direction defined by the target beamsplitter and the first beamsplitter, wherein the first beamsplitter is included in the first plurality of beamsplitters, and the method further comprises:
        configuring a third plurality of beamsplitters in the network of interconnected beamsplitters into the transmissive state, the third plurality of beamsplitters being located on a second beam path along a second direction defined by the target beamsplitter and the second beamsplitter, wherein the second beamsplitter is included in the third plurality of beamsplitters; and
        configuring a fourth plurality of beamsplitters in the network of interconnected beamsplitters into the reflective state, the fourth plurality of beamsplitters being located along at least one edge of the optical circuit,
    wherein the region is further defined by the third plurality of beamsplitters and the fourth plurality of beamsplitters.

8. The method of claim 1, wherein the imperfection identified by the target location includes a defect of the optical circuit.

9. The method of claim 1, wherein the imperfection identified by the target location includes an unresponsive optical component.

10. The method of claim 1, wherein the reconfigured optical circuit is a first reconfigured optical circuit and the region is a first region, the method further comprising:
configuring a third plurality of beamsplitters in the network of interconnected beamsplitters of the optical circuit into a fixed setting to reconfigure the first reconfigured optical circuit into a second reconfigured optical circuit that defines a second region different from the first region, the second reconfigured optical circuit configured to perform a linear transformation of (N-n) input optical modes, n being a number of mitigated imperfections.

11. The method of claim 10, wherein the imperfection is a first imperfection, and the second reconfigured optical circuit circumvents a second imperfection different from the first imperfection.

12. An apparatus, comprising:
N input ports, N being a positive integer; and
a network of interconnected beamsplitters in optical communication with the N input ports, the network of interconnected beamsplitters including:
a first plurality of beamsplitters located along a beam path traversing a target location and configured into a transmissive state, the target location identifying an imperfection in the network of interconnected beamsplitters;
a second plurality of beamsplitters located along at least one edge of the network of interconnected beamsplitters and configured into a reflective state, the first plurality of beamsplitters and the second plurality of beamsplitters defining a region of the network of interconnected beamsplitters, the region including the target location, and the first plurality of beamsplitters and the second plurality of beamsplitters circumventing the imperfection; and
a third plurality of beamsplitters that are reconfigurable and configured to perform a linear transformation on M input optical modes independent of the region, M being a positive integer less than N.

13. The apparatus of claim 12, wherein the third plurality of beamsplitters does not include any beamsplitter from the first plurality of beamsplitters and the second plurality of beamsplitters.

14. The apparatus of claim 12, wherein each beamsplitter in the network of interconnected beamsplitters includes a 2×2 reconfigurable beamsplitter.

15. The apparatus of claim 12, wherein the beam path is along a direction defined by a first end point of the optical circuit and a second end point of the network of interconnected beamsplitters.

16. The apparatus of claim 12, wherein:
the beam path is along a direction defined by a first end point of the network of interconnected beamsplitters and a second end point of the network of interconnected beamsplitters, the beam path intersecting with a first edge of the network of interconnected beamsplitters at a first intersection point and intersecting with a second edge of the network of interconnected beamsplitters at a second intersection point, and
the second plurality of beamsplitters are located: (i) along the first edge of the network of interconnected beamsplitters between the first intersection point and the first end point and (ii) along the second edge of the network of interconnected beamsplitters between the second intersection point and the second end point.

17. The apparatus of claim 12, wherein M=N−1.

18. The apparatus of claim 12, wherein the target location is on a waveguide connecting a first beamsplitter and a second beamsplitter in the network of interconnected beamsplitters, and the beam path is along a direction defined by the first beamsplitter and the second beamsplitter, wherein the first and second beamsplitters are included in the first plurality of beamsplitters.

19. An apparatus, comprising:
a plurality of input ports; and
a plurality of interconnected beamsplitters in optical communication with the plurality of input ports, the plurality of interconnected beamsplitters including:
a first plurality of beamsplitters located along a beam path traversing a target location and configured into a transmissive state, the target location identifying an imperfection in the plurality of interconnected beamsplitters;
a second plurality of beamsplitters located along at least one edge of the plurality of interconnected beamsplitters and configured into a reflective state, the first plurality of beamsplitters and the second plurality of beamsplitters defining a region of the plurality of interconnected beamsplitters, the region including the target location, and the first plurality of beamsplitters and the second plurality of beamsplitters circumventing the imperfection; and
a third plurality of beamsplitters configured to perform a linear transformation on a plurality of input optical modes independent of the region.

20. The apparatus of claim 19, wherein the third plurality of beamsplitters does not include any beamsplitter from the first plurality of beamsplitters and the second plurality of beamsplitters.

21. The apparatus of claim 19, wherein at least one beamsplitter from the plurality of interconnected beamsplitters includes a reconfigurable beamsplitter.

22. The apparatus of claim 19, wherein at least one beamsplitter from the plurality of interconnected beamsplitters includes a 2×2 reconfigurable beamsplitter.

23. The apparatus of claim 19, wherein one of:
the target location is on a waveguide connecting a first beamsplitter and a second beamsplitter in the plurality of interconnected beamsplitters, or
the beam path is along a direction defined by a first beamsplitter and a second beamsplitter connected by a waveguide containing the target location, wherein the first and second beamsplitters are included in the first plurality of beamsplitters.

* * * * *